(12) United States Patent
Miyazaki et al.

(10) Patent No.: US 6,529,690 B1
(45) Date of Patent: Mar. 4, 2003

(54) CAMERA FOR PREVENTING PLASTIC DEFORMATION OF LOCKING MEMBER OF LIGHT-SHIELDING DOOR OR FILM CARTRIDGE

(75) Inventors: Satoshi Miyazaki, Tokyo (JP); Yasuo Tambara, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/387,428

(22) Filed: Aug. 31, 1999

(30) Foreign Application Priority Data

Sep. 8, 1998 (JP) .......................... 10-254033
Oct. 26, 1998 (JP) .......................... 10-304106

(51) Int. Cl.$^7$ .......................... G03B 7/26; G03B 17/02; G03B 17/26
(52) U.S. Cl. .................. 396/536; 396/513; 396/277
(58) Field of Search ................. 396/535, 536, 396/513, 514, 301, 303, 538, 277

(56) References Cited

U.S. PATENT DOCUMENTS 5,713,057 A * 1/1998 Williams et al. ............ 396/513
5,822,635 A * 10/1998 Omi et al. .................. 396/513
6,049,679 A * 4/2000 DiRisio ...................... 396/513
6,085,043 A * 7/2000 Okuno ....................... 396/538

FOREIGN PATENT DOCUMENTS

JP 7-253616 10/1995
JP 7-306465 11/1995

* cited by examiner

Primary Examiner—Christopher Mahoney
(74) Attorney, Agent, or Firm—Frishauf, Holtz, Goodman & Chick, P.C.

(57) ABSTRACT

A camera uses a film cartridge having a light-shielding door for opening/closing a film inlet and outlet opening. A cartridge chamber accommodates the film cartridge. A cartridge chamber lid is provided at the opening of the cartridge chamber. A first driving mechanism drives the cartridge chamber lid. A second driving mechanism drives the light-shielding door. A control section controls the second driving mechanism to maintain the light-shielding door in an opened state when it is not possible to take out the film cartridge from the cartridge chamber.

21 Claims, 6 Drawing Sheets

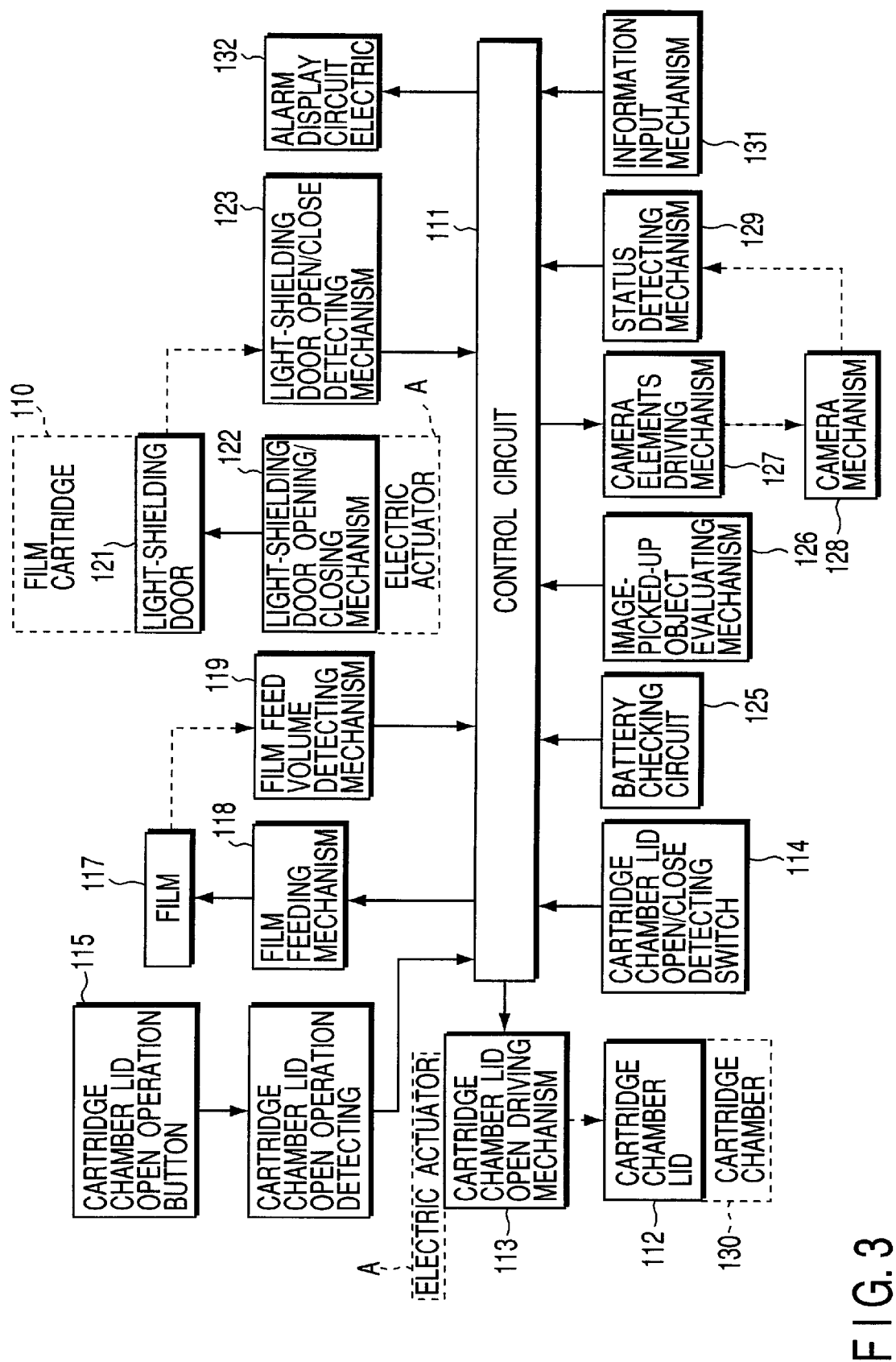
F I G. 3

CAMERA FOR PREVENTING PLASTIC DEFORMATION OF LOCKING MEMBER OF LIGHT-SHIELDING DOOR OR FILM CARTRIDGE

BACKGROUND OF THE INVENTION

The present invention relates to a camera, and relates, more particularly, to a camera using a film cartridge equipped with a light-shielding door to be electrically opened and closed, for example, at a film inlet and outlet opening.

A film cartridge of a film feed-out type currently available in the market is provided with an open/close system light-shielding door at a position near an opening for inlet and outlet of a film.

Therefore, for using this type of film cartridge, a camera needs to be provided with a mechanism for opening/closing this light-shielding door at the time of mounting or dismounting this film cartridge into or from the camera, as disclosed, for example, in Jpn. Pat. Appln. KOKAI Publication No. 7-253616 or the like.

This light-shielding door is provided movably between a closing position covering a film inlet and outlet opening for shielding an external light directed toward the inside of a film cartridge main body and an opening position for making it possible to feed out or wind back a film at a position sheltered from the film inlet and outlet opening.

However, in order to prevent a film from being exposed to a light by a careless opening of the light-shielding door while the film cartridge is being carried, the cartridge of this type needs to be equipped with a light-shielding door locking member for securely locking the light-shielding door at the closed position by restricting the move of the light-shielding door.

A film cartridge actually commercialized in the market uses a locking mechanism utilizing an elastic member as a mechanism of this locking member.

In a general camera or the like using this type of film cartridge, when the film cartridge is mounted in a cartridge chamber, a light-shielding door driving member provided in the cartridge chamber becomes engaged with a light-shielding door driving groove to make the light-shielding door locking member elastically deformed to cancel a locking state, and thereafter turns the light-shielding door to open it.

Then, when the light-shielding door is in completely opened state, the force for elastically deforming the locking member is removed.

Further, when a film winding has been completed and a film take-out operation is carried out to open a cartridge chamber lid, the light-shielding door is returned to a closed state before the cartridge chamber lid is opened.

Cameras recently available in the market are fully automated progressively. For example, as disclosed in Jpn. Pat. Appln. KOKAI Publication No. 7-306465 and others, not only a film feeding operation and a focus adjustment operation, but also an opening/closing operation of a film cartridge chamber lid and an opening/closing operation of a light-shielding door have come to be electrically driven by plunger or by motor.

According to these cameras, however, there are considered many cases where the power levels of power source batteries are lowered in the course of electrically driving various kinds of camera mechanisms so that it becomes impossible to operate the cameras themselves.

Therefore, in order to prevent a camera from being placed in such a situation in advance, a power source voltage level of a battery operation is checked prior to the starting of the operation. Based on a result of a detection of the check, a decision is made as to whether it is possible or not to operate the camera thereafter. When a decision has been made that it is not possible to operate the camera thereafter, the subsequent operation of the camera is prohibited.

However, the above camera operation control involves other problems.

These problems will be explained with reference to FIGS. 7A, 7B and 7C.

FIG. 7A is a view for illustrating a film cartridge with its light-shielding door in a closed state.

FIG. 7B is a view for illustrating the film cartridge with its light-shielding door in an opened state.

FIG. 7C is a partially enlarged view of FIG. 7B to show a state that a light-shielding door locking member is kept elastically deformed.

There will now be considered a case where pictures have been taken into all the film frames of a film in a camera using the above-described film feed-out type film cartridge, and after a film wind-back has been completed, a cartridge chamber lid opening button not shown is operated in an attempt to take out the film cartridge from the camera.

As shown in FIGS. 7A and 7B, a light-shielding door 3 is provided near an opening at a side surface 2 of a film cartridge 1.

In the normal operation, at first, an actuator not shown for electrically driving the light-shielding door 3 operates according to the operation of the cartridge chamber lid opening button, thereby to make a light-shielding door driving member 6 engaged with an engaging member 4 turn to a predetermined direction.

Then, the light-shielding door 3 is set in a closed state as shown in FIG. 7A.

Subsequently, an actuator not shown for opening/closing the cartridge chamber lid is operated so that the cartridge chamber lid is set to an opened state.

Further, for setting the light-shielding door 3 to an opened state, as shown in FIG. 7B, the actuator not shown for electrically driving the light-shielding door 3 operates to make the light-shielding door 3 turn through the light-shielding door driving member 6 and the engaging member 4, thereby to set the light-shielding door 3 to the opened state.

As explained above, in the normal operation, when the film is mounted, the light-shielding door 3 is driven to an opened state, and then a film automatic loading operation is executed.

In the camera of this type, a battery check operation is carried out when a new film cartridge has been mounted into the camera, in order to prevent the camera from being put in an inoperable situation during the film automatic loading operation.

As a result of this battery check operation, when a decision has been made that a battery voltage level is not sufficient for the automatic loading, the operation of a change from a closing to an opening of the light-shielding door and the automatic loading operation are prohibited.

In general, the open operation of the cartridge chamber lid requires a larger driving force than the close operation of the light-shielding door 3.

Accordingly, a current to be supplied to the actuator for opening the cartridge chamber lid is much larger than a current to be supplied to the actuator for closing the cartridge chamber lid.

Therefore, when the capacity of the power source battery is lowered, there could arise a situation that it is not possible to open the cartridge chamber lid although it is possible to close the light-shielding door 3.

In this situation, the light-shielding door locking member 5 is kept in an elastically deformed state, as shown in FIG. 7C.

Therefore, when this state is left as it is, a creep phenomenon occurs so that this light-shielding door locking member 5 is plastically deformed, which may result in a risk of it becoming difficult to execute a subsequent locking sufficiently.

Furthermore, there arises a similar problem to the above when some failure has occurred in the opening mechanism of the cartridge chamber lid, for example, when there arises a situation that it is not possible to open the cartridge chamber lid despite an attempt to make it in the opened state.

BRIEF SUMMARY OF THE INVENTION

It is an object of the present invention to provide a camera which can avoid a plastic deformation of a light-shielding door locking member followed by a subsequent insufficient locking operation, when the capacity of a power source battery has been reduced to a lower level or when some failure has occurred in the opening mechanism of a cartridge chamber lid.

In order to achieve the above object of the invention, according to one aspect of the invention, for example, there is provided a camera adapted to use a film cartridge having a light-shielding door for opening/closing a film inlet and outlet opening, wherein the camera comprises: a cartridge chamber for accommodating the film cartridge; a cartridge chamber lid disposed at an opening of the cartridge chamber; a first driving mechanism for driving the cartridge chamber lid; a second driving mechanism for driving the light-shielding door; and control means for controlling the second driving mechanism to maintain the light-shielding door in an opened state when it is not possible to take out the film cartridge from the cartridge chamber.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a block diagram for showing a structure of whole key parts of a camera according to a second embodiment of the present invention.

FIGS. 7A, 7B and 7C are views for illustrating a structure of a conventional film cartridge respectively, wherein FIG. 7A is a view for illustrating a film cartridge with its light-shielding door in a closed state, FIG. 7B is a view for illustrating the film cartridge with its light-shielding door in an opened state, and FIG. 7C is a partially enlarged view of FIG. 7B to show a state that a light-shielding door locking member is kept elastically deformed.

DETAILED DESCRIPTION OF THE INVENTION

Figure 1:
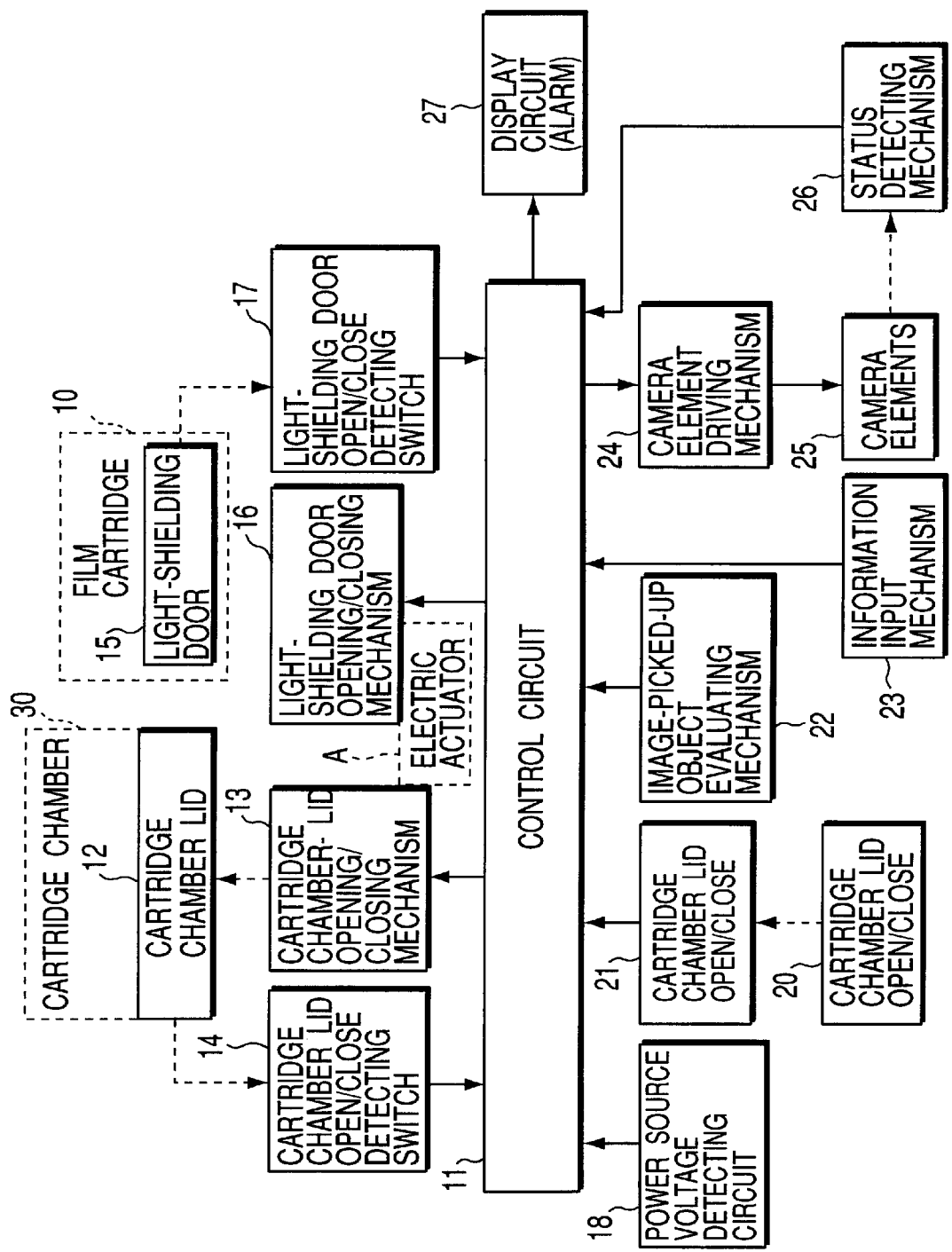
FIG. 1 is a block diagram for showing a structure of whole key parts of a camera according to a first embodiment of the present invention.

Reference will now be made in detail to the presently preferred embodiments of the invention as illustrated in the accompanying drawings, in which like reference characters designate like or corresponding parts throughout the several drawings.

Embodiments of the present invention will be explained below with reference to the drawings.

First Embodiment

FIG. 1 is a block diagram for showing a structure of whole key parts of a camera according to a first embodiment of the present invention.

In FIG. 1, a control circuit 11 is control means constituted by a microcomputer and others, for controlling a sequence and the like relating to the operations of a camera.

To this control circuit 11, there are connected various kinds of circuits and mechanisms including mechanisms relating to mounting/dismounting of a cartridge, and other mechanisms including, for example, a mechanism relating to photographing.

Figure 7A:
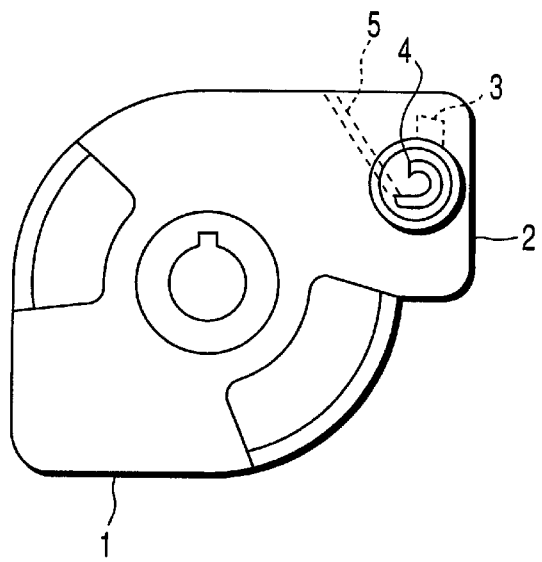
Figure 7B:
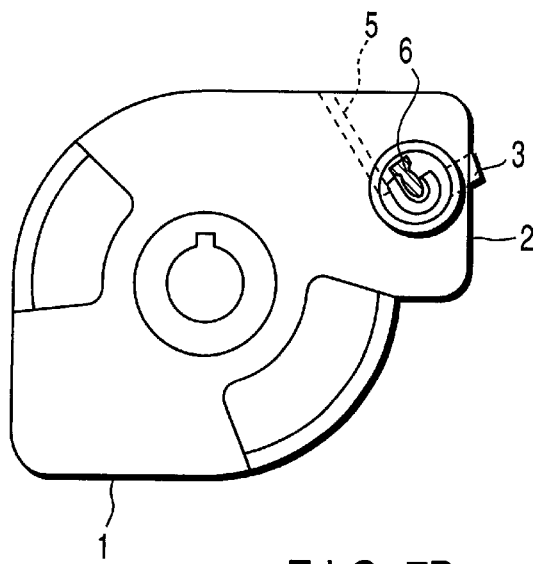
Figure 7C:
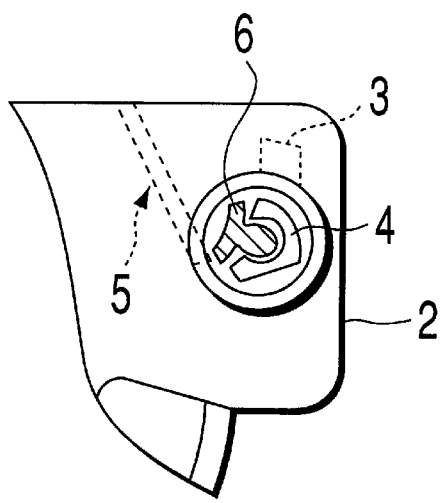

More specifically, the control circuit 11 is connected with a cartridge chamber lid opening/closing mechanism 13 as a first driving mechanism for opening/closing a cartridge chamber lid 12 by receiving a driving force from a motor (not shown) and others, a cartridge chamber lid open/close detecting switch (SW) 14 as detecting means for detecting a state that the cartridge chamber lid 12 has been driven by the cartridge chamber lid opening/closing mechanism 13 and for transmitting this state to the control circuit 11, a light-shielding door opening/closing mechanism 16 as a second driving mechanism for electrically opening/closing a light-shielding door (3 in FIG. 7) 15 of a film cartridge (1 in FIG. 7) 10 as shown in FIGS. 7A, 7B and 7C, and a light-shielding door open/close detecting switch (SW) 17 for detecting an open/close state of the light-shielding door 15 and for transmitting this state to the control circuit 11.

The light-shielding door opening/closing mechanism 16 includes a driving member for being engaged with an engaging section of the film cartridge 10, and drives this member by motor not shown.

The control circuit 11 is further connected with a power source voltage detecting circuit 18 as decision means for converting a voltage of a power source battery into digital data by an analog/digital (A/D) converter and for transmitting this digital data to the control circuit 11, and a cartridge chamber lid open/close operation switch (SW) 21 for transmitting a signal to the control circuit 11 in co-operation with a cartridge chamber lid open/close operation button 20 provided on the external surface of a camera main body (not shown).

The cartridge chamber lid opening/closing mechanism 13 and the light-shielding door opening/closing mechanism 16 may be structured to be driven by an electric actuator A like a plunger, other than the motor as their driving source.

Further, instead of providing exclusive actuators for respective mechanisms, a common actuator may be provided to be able to switch over a driving force from one mechanism to the other during the operation of a driving mechanism.

The control circuit 11 is further connected with an image-picked-up object evaluating mechanism 22 for detecting information of an image-picked-up object such as luminance of the object and distance from the object necessary for photographing, and for transmitting this information to the control circuit 11, an information input mechanism 23 for inputting information such as ISO sensitivity and exposure correction, etc. displayed on the film cartridge 10, and for transmitting this information to the control circuit 11, and camera element driving mechanism 24 for driving camera elements 25 such as a focus adjusting mechanism including an image pick-up lens and a focus adjusting lens, a focusing mechanism, a shutter mechanism and a film feeding mechanism, that are not shown, according to control signals from the control circuit 11.

The control circuit 11 is further connected with a state detecting mechanism 26 consisting of a plurality of switches for detecting a state of the camera elements 25 at a current time, such as, for example, a current position of the focus adjusting lens, a shutter open/close state, a stop level, a film feeding state, etc., and a display circuit 27 including an alarm display, for displaying various kinds of state of the camera.

As a detecting operation of the power source voltage detecting circuit 18, it is general to measure a voltage reduction when a current is flown to a pseudo load. However, an open voltage may also be measured depending on the characteristics of the battery.

A result of the measurement by the power source voltage detecting circuit 18 is used as a material for making a decision of a battery remaining capacity.

In the above structure, the mechanism relating to the mounting/dismounting of the cartridge is constituted by the cartridge chamber lid opening/closing mechanism 13, the cartridge chamber lid open/close detecting switch 14, the light-shielding door opening/closing mechanism 16, the light-shielding door open/close detecting switch 17 and the cartridge chamber lid open/close operation switch 21.

On the other hand, the mechanism relating to the photographing is constituted by the image-picked-up object evaluating mechanism 22, the information input mechanism 23 and the camera element driving mechanism 24.

Figure 2:
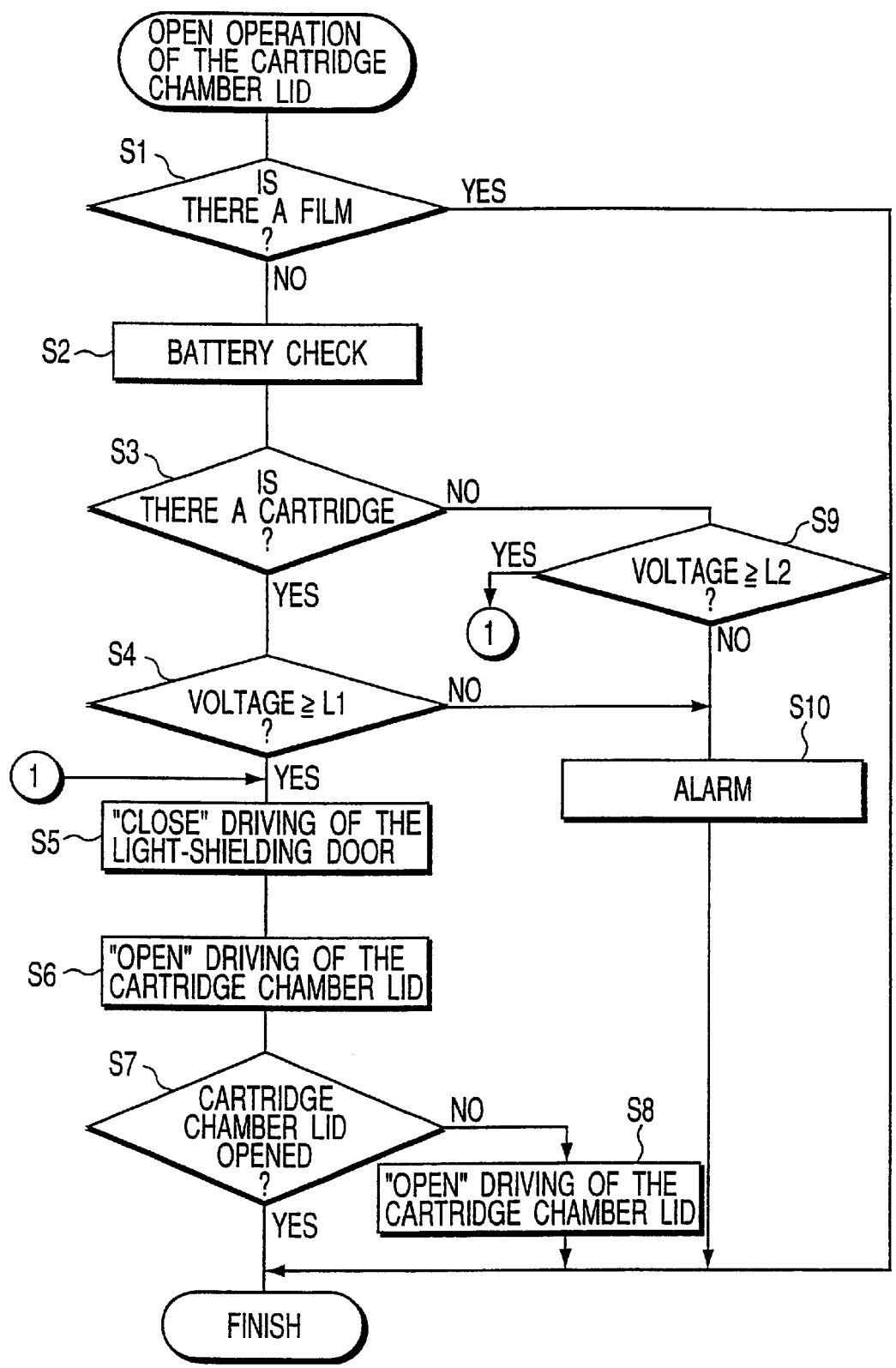
FIG. 2 is a flowchart for explaining the open operation of a cartridge chamber lid in the camera according to the first embodiment of the invention.

The open operation of the cartridge chamber lid 12 in the camera according to the first embodiment of the present invention will be explained next with reference to a flow-chart shown in FIG. 2.

Normally, this operation is carried out when the film cartridge 10 containing an unexposed film is to be mounted in the camera main body not shown, or when the film cartridge 10 containing a film completely wound back after the exposure of the film by picking up images is to be taken out from the camera main body not shown. The execution of this operation is started when an open operation signal is input from the cartridge chamber lid open/close operation switch 21 in a switch input waiting state.

All the operations including this operation are executed by the control of the control circuit 11 according to a program stored in advance in the read-only memory (ROM) within the control circuit 11.

At first, in step S1, based on a result of a detection of the state detecting mechanism 26, a decision is made as to whether or not the film in the film cartridge 10 has been in the state of being fed out from the cartridge into the camera main body, that is, whether or not the film wind-back operation is yet to be completed.

In this case, when a decision has been made that the film is not being fed out from the cartridge into the camera main body, the process proceeds to step S2, and a result of a measurement of a current power source voltage is obtained from the power source voltage detecting circuit 18.

On the other hand, when a decision has been made in the step S1 that the film is being fed out from the cartridge into the camera main body, the cartridge chamber lid 12 cannot be opened, and therefore, this sequence finishes without any action.

In step S3, a decision is made as to whether or not the film cartridge 10 has already been mounted in the cartridge chamber 30 of the camera main body, that is, whether or not the film cartridge 10 remains in the cartridge chamber 30 in the state that the film wind-back has been completed.

In this case, a state that the cartridge chamber lid open/close button 20 has been operated in the state that the film cartridge 10 has already been mounted in the cartridge chamber means a state that the film cartridge 10 containing the film after completion of the image pick-up of all frames is going to be taken out from the cartridge chamber 30.

On the other hand, a state that the film cartridge 10 has not yet been mounted means a state that a new film cartridge 10 is going to be mounted in the cartridge chamber 30.

Accordingly, when the film cartridge 10 has been mounted in the above step S3, the process goes to step S4, and a decision is made as to whether or not the battery voltage is at a first decision level L1 or above.

The level L1 is a level of the battery voltage at which the film cartridge 10 after finishing the photographing can be taken out from the cartridge chamber 30m, that is, a level of the battery remaining capacity that can guarantee the close driving of the light-shielding door 15 and the open operation of the cartridge chamber 30.

When the battery voltage is at the first voltage decision level L1 or above in the above step S4, the process proceeds to step S5, and the light-shielding door 15 is set to an opened state.

This operation is executed when a control signal has been sent from the control circuit 11 to the light-shielding door opening/closing mechanism 16 and the light-shielding door opening/closing mechanism 16 drives the actuator for driving the light-shielding door according to this signal.

Next, in step S6, the cartridge chamber lid 12 is set to the opened state.

This operation is executed when a control signal has been sent from the control circuit 11 to the cartridge chamber lid opening/closing mechanism 13 and the cartridge chamber lid opening/closing mechanism 13 drives the actuator for driving the cartridge chamber lid according to this signal.

Next, in step S7, a decision is made as to whether or not the cartridge chamber lid 12 has been actually opened based on an output of the cartridge chamber lid open/close detecting switch 14.

In this case, when a decision has been made that the cartridge chamber lid 12 is in the opened state, the sequence of "open operation of the cartridge" finishes.

On the other hand, when the cartridge chamber lid 12 is not in the opened state in the above step S7, it is considered that the opening mechanism of the cartridge chamber lid opening/closing mechanism 13 is in a fault state or the cartridge chamber lid 12 is being pressed by some force from the outside.

Accordingly, the step proceeds to step S8, and a control signal is sent from the control circuit 11 to the light-shielding door opening/closing mechanism 13 so that the light-shielding door 12 is set to the opened state again.

This is for preventing the light-shielding door locking member (5) from being plastically deformed in the film cartridge 10 as shown in FIG. 7C.

Thereafter, no action is taken, and the sequence of this "open operation of the cartridge" finishes.

When a decision is made that there is no cartridge in the above step S3, a new film cartridge 10 is being mounted. Therefore, the process proceeds to step S9, and a decision is made as to whether or not the battery voltage is at the second voltage decision level L2 or above.

This level L2 is a level of a battery remaining capacity which guarantees the execution of a predetermined operation after the film cartridge 10 containing the new film has been mounted, for example, the execution of the film feeding operation and the image pick-up operation.

In the above step S9, when the battery voltage level is L2 or above, the process proceeds to step S5, and the above-described operation is executed.

On the other hand, when the power source voltage level is less than L2 in the step S9, the process proceeds to step S10, and a control signal from the control circuit 11 for alarming that the power source voltage level is lower than the L2 level is displayed in the display circuit 27. Then, the display circuit 27 finishes the operation.

Upon receiving the control signal, the display circuit 27 executes an alarm display operation to show that the photographing operation is not possible.

When a decision has been made in the step S4 that the battery voltage is not L1 or above, the process proceeds to step S10.

Then, a control signal for alarming that the battery voltage is lower than the L1 level is output to the display circuit 27. After the display circuit 27 has made a predetermined display, the operation finishes.

In this case, upon receiving the control signal, the display circuit 27 executes an alarm display operation to show that the open operation of the cartridge chamber lid is not possible.

Second Embodiment

Next, a camera according to a second embodiment of the present invention will be explained.

FIG. 3 is a block diagram for showing a structure of whole key parts of a camera according to the second embodiment of the invention.

In FIG. 3, a control circuit 111 is control means constituted by a microcomputer and others, for controlling a sequence and the like relating to the operations of a camera.

To this control circuit 111, there are connected various kinds of circuits and mechanisms including mechanisms relating to mounting/dismounting of a cartridge, and other mechanisms including, for example, a mechanism relating to photographing.

The control circuit 111 is connected with a cartridge chamber lid open driving mechanism 113 for electrically opening a cartridge chamber lid 112 by receiving a driving force from a motor (not shown), a cartridge chamber lid open/close operation detecting mechanism 114 for detecting a state that the cartridge chamber lid 112 has been driven by the cartridge chamber lid open driving mechanism 113 and for transmitting this state to the control circuit 111, and a cartridge chamber lid open/close operation detecting switch (SW) 116 for detecting a state that the cartridge chamber lid 112 has been opened by operating a cartridge chamber lid open/close operation button 115 or a state that the cartridge chamber lid has been closed manually, and for transmitting this state to the control circuit 111.

The cartridge chamber lid open driving mechanism 113 is operated when the cartridge chamber lid open operation button 115 has been operated by a photographer and the cartridge chamber lid open operation detecting switch 116 has been turned on.

The control circuit 111 is connected with a film feeding mechanism 118 as film loading means for carrying out a loading of a film 117 (the operation of feeding out the film 117 from a film cartridge 110 and a winding to a first frame), a one-frame winding operation after an image pick-up, and a wind-back operation after picking up the whole frames, a film feed volume detecting mechanism 119 for detecting a feed volume of the film 117, an light-shielding door opening/closing mechanism 122 as open/close means for electrically opening/closing a light-shielding door 121 of the film cartridge 110, and a light-shielding door open/close detecting mechanism 123 for detecting an open/close state of the light-shielding door 121 and transmitting this state to the control circuit 111.

The light-shielding door opening/closing mechanism 122 includes a driving member for being engaged with an engaging section of the film cartridge 110, and drives this member by motor not shown.

The cartridge chamber lid open driving mechanism 113 and the light-shielding door opening/closing mechanism 122 may be structured by an electric actuator A like a plunger or the like, other than the motor.

Further, instead of providing exclusive actuators for respective mechanisms, a common actuator may be provided to be able to switch over a driving force from one mechanism to the other during the operation of a driving mechanism.

The control circuit 111 is further connected with a battery checking circuit 125 as battery checking means for converting a voltage of a power source battery not shown into digital data by an analog/digital (A/D) converter and for transmitting the digital data to the control circuit 111, an image-picked-up object evaluating means 126 for detecting information on the image-picked-up object such as luminance of the object and a distance from the object necessary for photographing, and for transmitting this information to the control circuit 111, a camera element driving mechanism 127 as camera operation means for driving a camera mechanism 128 including an image pick-up lens, a focus adjusting mechanism, a stopping mechanism, a shutter mechanism, etc., other than the film feeding mechanism 118, according to control signals from the control circuit 111, a state detecting mechanism 129 structured by a plurality of switches for detecting a state at a current time of the camera mechanism 128, such as, for example, a current position of the focus adjusting lens, an open/close state of the shutter, a stopping volume, etc., an information input mechanism 131 for inputting information of ISO sensitivity, an exposure correction, etc. displayed on the film cartridge 110 and for transmitting this information to the control circuit 111, and an alarm display circuit 132 for displaying various states of the camera.

As a detecting operation of the battery checking circuit 125, it is general to measure a voltage reduction when a current is flown to a pseudo load. However, an open voltage may also be measured depending on the characteristics of the battery. A measured voltage is compared with a predetermined voltage, and a remaining battery capacity can be estimated from a result of the comparison.

For the operation of the battery checking circuit 125, the battery remaining capacity can also be decided by a comparator circuit by dividing a power source voltage, in addition to the above-described detection using the A/D converter.

The alarm display circuit 132 is for alarm displaying a state of the camera based on a result of a battery check. This alarm display is carried out, for example, in voice using a PCV or by light flicker using a LED, a LCD or the like.

In the above-described structure, the mechanism relating to the mounting/dismounting of the cartridge is constituted by the cartridge chamber lid open driving mechanism 113, the cartridge chamber lid open/close operation detecting mechanism 114, the cartridge chamber lid open/close operation detecting switch 116, the film feeding mechanism 118, the film feed volume detecting mechanism 119, the light-shielding door opening/closing mechanism 112, and the light-shielding door open/close detecting mechanism 123.

On the other hand, the mechanism relating to the photographing is constituted by the image-picked-up object evaluating means 126, the camera element driving mechanism 127, the state detecting mechanism 129, and the information input mechanism 131.

The open/close operation of the cartridge chamber lid 112 will be explained next with reference to a flowchart shown in FIG. 4.

Figure 4:
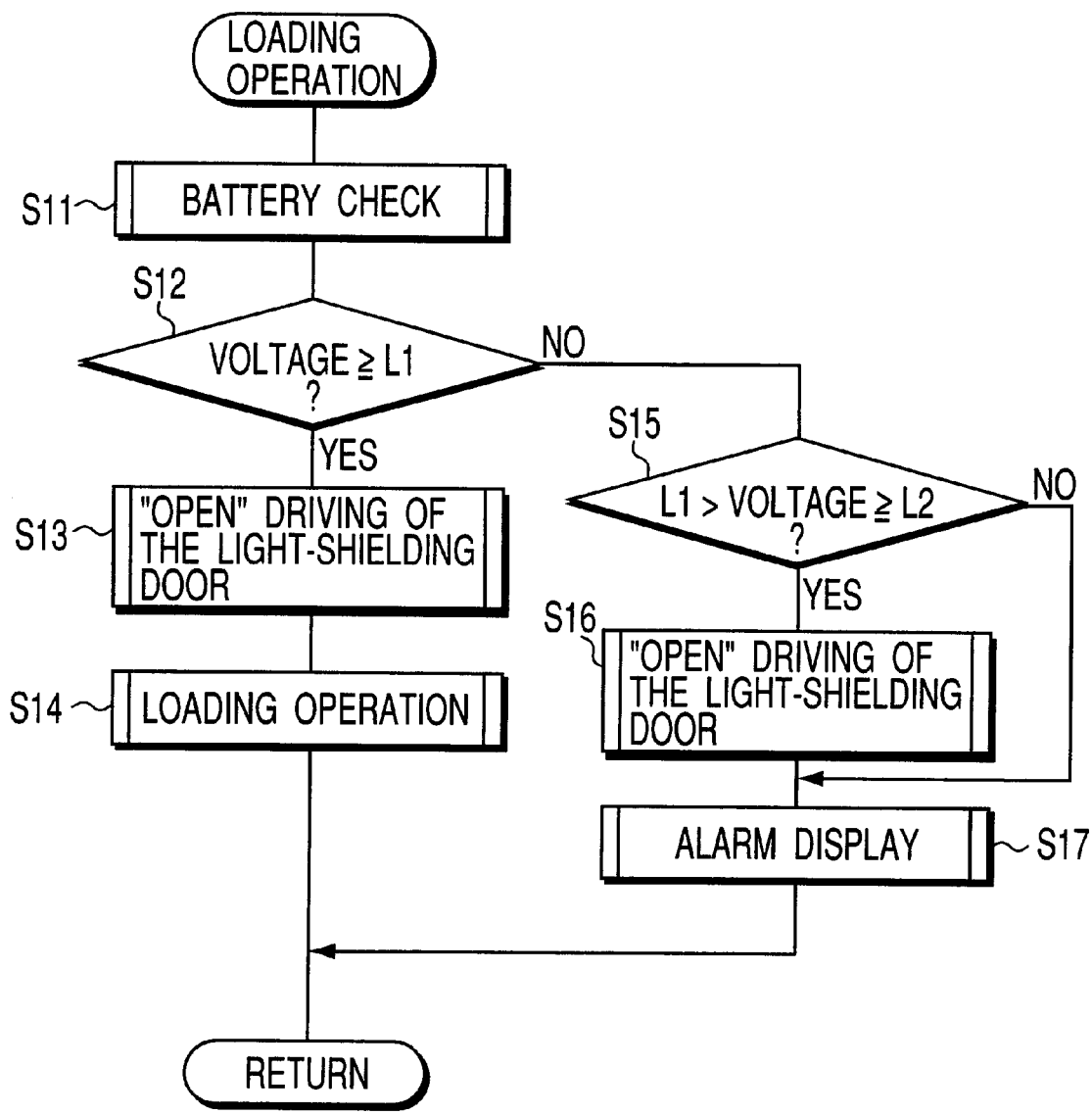
FIG. 4 is a flowchart for explaining a film loading operation to be executed after a photographer has mounted a new film cartridge into a cartridge chamber by opening a cartridge chamber lid and then has closed the cartridge chamber lid again, according to the second embodiment of the invention.

FIG. 4 shows a film loading operation sequence to be executed after a photographer has mounted the new film cartridge 110 into a cartridge chamber 130 by opening the cartridge chamber lid 112 and then has closed the cartridge chamber lid 112 again.

Normally, this operation is carried out in response to a signal, that is, a signal for showing that the cartridge chamber lid 112 has been closed, detected by the cartridge chamber lid open/close operation detecting mechanism 114, in a waiting state of the switch input in the main routine.

All the operations including this operation are executed by the control of the control circuit 111 according to a program stored in the read-only memory (ROM) within the control circuit 111.

At first, in step S11, a battery check operation is carried out.

This is an operation for measuring by the A/D converter a reduction in voltage when a current is flown to a pseudo load, such as, for example, a resistor, as described above.

Then, in step S12, a result of the measuring is compared with a decision level L1 that is a predetermined level.

The decision level L1 is a level for deciding whether or not the remaining capacity of the power source battery is sufficient enough to execute the "film loading operation", that is, whether the remaining capacity of the power source battery can complete the film loading operation without stopping in the middle.

This value is set at the time of designing the camera, together with the value of the pseudo load.

When the measured voltage is L1 or above in the step S12, the process proceeds to step S13, and the "light-shielding door open operation" is executed prior to the "film loading operation".

The light-shielding door open operation is an operation for opening the light-shielding door 121 of the film cartridge 110 by the light-shielding door opening/closing mechanism 122.

As the driving load of the light-shielding door opening/closing mechanism 122 is smaller than that of the film feeding mechanism 118, when the voltage level checked in the step S1 is L1 or above, the light-shielding door opening/closing mechanism 122 can operate without problem.

Whether the light-shielding door 121 has been actually opened or not is detected by the light-shielding door open/close detecting mechanism 123. When the opened state has been detected, this operation is finished.

Then, the "loading operation" is executed in step S14.

The loading operation is an operation for feeding out the film 117 from within the film cartridge 110 and bringing the first frame of the film 117 to an image pick-up open position by the film feeding mechanism 118.

This operation is controlled according to a result of a detection by the film feed volume detecting mechanism 119.

When the remaining capacity of the power source battery is sufficient, the loading operation is finished with the above-described flow.

However, when the battery remaining capacity becomes smaller, that is, when a decision has been made in the step S12 that the voltage is not L1 or above (that is, less than L1), the process proceeds to step S15. In other words, when a decision has been made that it is not possible to execute the "film loading operation", the process proceeds to step S15.

In the step S15, it is checked whether the voltage level is at a predetermined decision level L2 or above, the L2 being different from the decision level L1.

This decision level L2 is for deciding whether it is possible or not to carry out the "open operation of the light-shielding door", and the voltage value of L2 is smaller than the voltage value of L1 (L1>L2).

As a result of the comparison in the step S15, when the measured voltage is L2 or above, it is possible to carry out the "open operation of the light-shielding door" although it is not possible to carry out the "film loading operation". Accordingly, the process proceeds to step S16, and the "open operation of the light-shielding door" is executed.

Then, the process proceeds to the "alarm display" in step S17, and a state that the remaining capacity of the battery is small is displayed in the alarm display circuit 132. Then, the process returns.

On the other hand, when the measured voltage is not L2 or above, that is, when the measured voltage is less than L2, in the step S5, this indicates a state that the remaining capacity of the battery has been reduced to a level at which it is not possible to drive any one of the actuators.

Accordingly, in this case, the process proceeds to step S17, and the "alarm display" for indicating that the battery capacity has been exhausted is displayed in the alarm display circuit 132, and then the process returns.

When the process has returned to the main routine after carrying out the alarm display, the subsequent camera operations are not possible. Therefore, it is desirable that the camera is directly put in the open locked state.

As explained above, according to the second embodiment of the invention, when a measured voltage level of the battery at the battery check time is less than the first decision level (L1) at which it is possible to carry out the "film loading operation", the camera is not directly put to the locked state. Instead, it is checked whether the measured voltage level is equal to or above the second decision level (L2) at which it is possible to carry out the "open operation of the light-shielding door". If the measured voltage level is the second decision level or above, only the "open operation of the light-shielding door" is carried out without carrying out the "film loading operation".

Third Embodiment

Next, a camera according to a third embodiment of the present invention will be explained.

Figure 5:
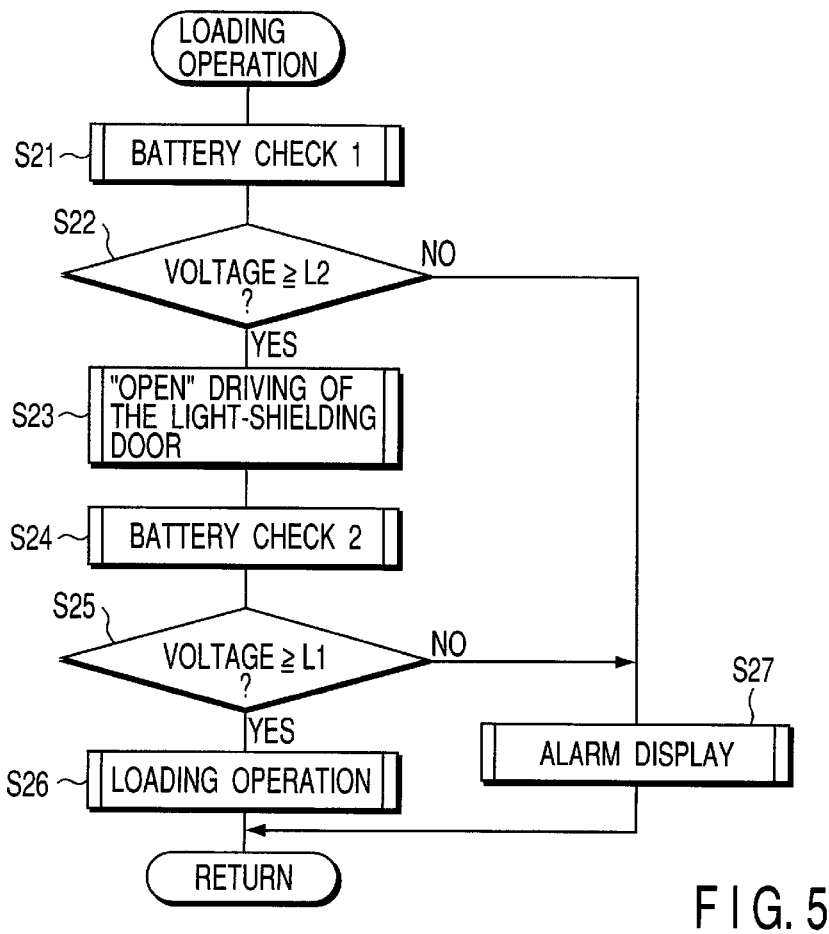
FIG. 5 is a flowchart for explaining the film loading operation according to the second embodiment of the invention.

FIG. 5 is a flowchart for explaining a film loading operation in a camera according to the third embodiment of the invention.

The structure of the camera in the third embodiment is the same as the structure of the camera in the second embodiment shown in FIG. 3.

In this example, at first, the "battery check 1" for deciding whether it is possible or not to carry out the "open operation of the light-shielding door" is executed in step S21.

Next, in step S22, a measured voltage is compared with the decision level L2 that is the lower decision value.

When the measured voltage is less than L2, the process proceeds to step S27, and the "alarm display" for indicating that the battery has been exhausted is displayed in the alarm display circuit 132. Then, the process returns.

On the other hand, when the measured voltage is L2 or above, the "open operation of the light-shielding door" is executed in step S23. Then, in step S24, the "battery check 2" is executed for deciding whether it is possible or not to carry out the "film feeding operation".

Then, in step S25, the measured voltage is compared with the decision level L1.

In this case, when the measured voltage is less than L1, the process proceeds to step S27, and the "alarm display" for indicating that the battery has been exhausted is displayed in the alarm display circuit 132. Then, the process returns.

On the other hand, when the measured voltage is L1 or above, the "loading operation" is executed in step S26, and the process returns.

As explained above, according to the third embodiment, at first, the "battery check 1" is executed for deciding whether it is possible or not to carry out the "open operation of the light-shielding door". After the execution of the "open operation of the light-shielding door", the "battery check 2" is executed for deciding whether it is possible or not to carry out the "film feeding operation". In this respect, the third embodiment is different from the second embodiment.

According to the third embodiment, battery check is carried out twice. Thus, consideration is given to battery exhausting in the "open operation of the light-shielding door".

Fourth Embodiment

Next, a camera according to a fourth embodiment of the present invention will be explained.

Figure 6:
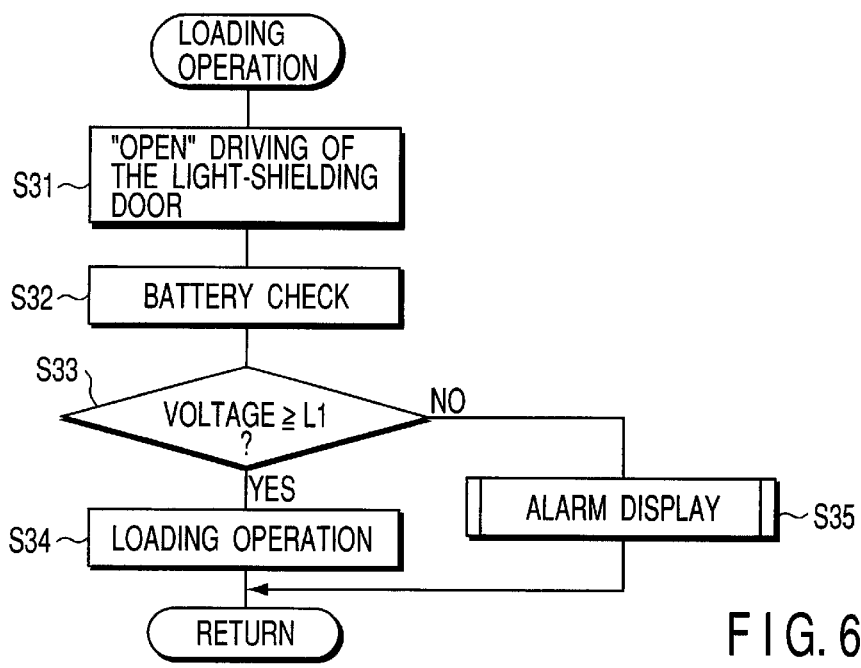
FIG. 6 is a flowchart for explaining a film loading operation according to a third embodiment of the present invention.

FIG. 6 is a flowchart for explaining a film loading operation in a camera according to the fourth embodiment of the invention.

The structure of the camera in the fourth embodiment is the same as the structure of the camera in the second embodiment shown in FIG. 3.

At first, the "open operation of the light-shielding door" is executed in step S31. Then, the "battery check" for deciding whether it is possible or not to carry out the "film feeding operation" is carried out in step S32.

Next, in step S33, a measured voltage is compared with the decision level L1.

When the measured voltage is less than L1, the process proceeds to step S35, and the "alarm display" for indicating that the battery has been exhausted is displayed in the alarm display circuit 132. Then, the process returns.

On the other hand, when the measured voltage is L1 or above, the process proceeds to step S34, and the "loading operation" is executed. Then, the process returns.

As explained above, according to the fourth embodiment, the battery check relating to the "open operation of the light-shielding door" is abolished. Regardless of the battery remaining capacity, the "open operation of the light-shielding door" is executed and then the battery check is carried out, for the following reason.

The battery check for deciding whether it is possible or not to carry out the "open operation of the light-shielding door" is abolished to save time and process, based on a fact that it is possible to carry out the "open operation of the light-shielding door" at considerably high probability levels regardless of a small battery remaining capacity as the load of the light-shielding door opening/closing mechanism is small, that is, the power consumption for the operation of the light-shielding door opening/closing mechanism is small.

As explained above, according to the present invention, it is possible to provide a camera which can avoid a plastic deformation of the light-shielding door locking member followed by a subsequent insufficient locking operation, when the capacity of the power source battery has been reduced to a lower level or when some fault has occurred in the opening mechanism of the cartridge chamber lid, as shown particularly in the first embodiment.

Further, according to the present invention, when a decision has been made as a result of a battery checking operation that it is possible to open the light-shielding door even though it is not possible to feed the film, the film feeding operation is prohibited and only the open operation of the light-shielding door is permitted, as shown particularly in the second to fourth embodiments. Accordingly, it is possible to reduce the frequency of the occurrence of the inconvenience that the light-shielding door locking member is plastically deformed because of the leaving of the light-shielding door in the opened state.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera adapted to use a film cartridge having a light-shielding door for opening/closing a film inlet and output opening, the camera comprising:
    a cartridge chamber for accommodating the film cartridge;
    a cartridge chamber lid disposed at an opening of the cartridge chamber;
    a first driving mechanism for driving the cartridge chamber lid;
    a second driving mechanism for driving the light-shielding door; and
    control means for controlling the second driving mechanism to maintain the light-shielding door in an opened state when it is not possible to take out the film cartridge from the cartridge chamber.

2. A camera according to claim 1, further comprising decision means for deciding a remaining capacity of a power source battery, wherein
    the control means controls the second driving mechanism according to an output of the decision means.

3. A camera according to claim 1, further comprising detecting means for detecting an open/close state of the cartridge chamber lid, wherein
    the control means controls the second driving mechanism according to an output of the detecting means.

4. A camera adapted to draw out a film from a film cartridge having an opening and a light-shielding door for shielding and releasing the opening, the camera comprising:
    a cartridge chamber for accommodating the film cartridge;
    a cartridge chamber lid disposed at an opening of the film cartridge chamber;
    a first driving mechanism for driving the cartridge chamber lid;
    a second driving mechanism for driving the light-shielding door; and
    control means for maintaining the light-shielding door in an opened state when it is not possible to take out the film cartridge from the cartridge chamber.

5. A camera according to claim 4, further comprising decision means for deciding a remaining capacity of a power source battery, wherein
    the control means controls the second driving mechanism according to an output of the decision means.

6. A camera according to claim 4, further comprising detecting means for detecting an open/close state of the cartridge chamber lid, wherein
    the control means controls the second driving mechanism according to an output of the detecting means.

7. A camera adapted to draw out a film from a film cartridge having an opening and a light-shielding door for shielding and releasing the opening, the camera comprising:
    a cartridge chamber for accommodating the film cartridge;
    a cartridge chamber lid disposed at an opening of the film cartridge chamber;
    a first driving mechanism for driving the cartridge chamber lid;
    a second driving mechanism for driving the light-shielding door;
    decision means for deciding a remaining capacity of a power source battery; and
    control means for controlling the second driving mechanism to maintain the light-shielding door in an opened state when a decision has been made by the decision means that the remaining capacity of the power source battery is smaller than a predetermined value.

8. A camera adapted to draw out a film from a film cartridge having an opening and a light-shielding door for shielding and releasing the opening, the camera comprising:
    a cartridge chamber for accommodating the film cartridge;
    a cartridge chamber lid disposed at an opening of the film cartridge chamber;
    a first driving mechanism for driving the cartridge chamber lid;
    a second driving mechanism for driving the light-shielding door;
    detecting means for detecting an open/close state of the cartridge chamber lid; and
    control means for controlling the second driving mechanism to maintain the light-shielding door in an opened state when a decision has been made by the detecting means that it is not possible to set the cartridge chamber lid in an opened state.

9. A camera according to claim 8, wherein the first driving mechanism and the second driving mechanism comprise a common actuator.

10. A camera adapted to use a film cartridge having a light-shielding door that can be opened and closed, the camera comprising:
    a cartridge accommodation chamber for accommodating the film cartridge;
    an openable and closable lid member provided on the cartridge accommodation chamber;
    a first driving section for open/close driving the lid member;
    a second driving section for open/close driving the light-shielding door;
    detecting means for detecting an open/close state of the lid member; and
    an electric actuator for driving the first and second driving sections,
    wherein the second driving section opens the light-shielding door once closed, when it has not been detected by at least the detecting means that the lid member is opened.

11. A camera according to claim 10, further comprising battery checking means for measuring a remaining capacity of a battery, wherein
    the second driving means is prohibited to operate when a decision has been made by the battery checking means that the battery capacity is at or below a predetermined value.

12. A camera adapted to use a film cartridge having a film drawing opening and a light-shielding door disposed at the film drawing opening and biased in a closed state by an elastically deformable locking member, the camera comprising:
    a cartridge accommodation chamber for accommodating the film cartridge;
    a lid member provided on the cartridge accommodation chamber;
    light-shielding door driving means for open/close driving the light-shielding door of the film cartridge accommodated in the cartridge accommodation chamber; and
    state deciding means for deciding based on a battery remaining capacity whether or not it is possible to take out the film cartridge from the cartridge accommodation chamber, wherein when a decision has been made by the state deciding means that it is not possible to take out the film cartridge, the light-shielding door driving means prohibits a close operation of the light-shielding door.

13. A camera according to claim 12, wherein the lid member of the cartridge accommodation chamber has a locking mechanism for maintaining a closed state.

14. A camera adapted to use a film cartridge having a light-shielding door for opening/closing a film inlet and outlet opening, the camera comprising:

a cartridge chamber for accommodating the film cartridge;

a light-shielding door driving mechanism for open/close driving the light-shielding door; and control means for controlling the light-shielding door driving mechanism to maintain the light-shielding door in an opened state when it is not possible to take out the film cartridge from the cartridge chamber.

15. A camera according to claim 14, wherein the control means controls the light-shielding door to return to an opened state when the light-shielding door has been closed during a failed process of taking out the film cartridge and it is not possible to take out the film cartridge from the cartridge chamber.

16. A camera adapted to use a film cartridge having a film accommodated therein, an opening for feeding out the film, and a light-shielding door for shielding and releasing the opening, the camera comprising:

open/close driving means for electrically driving the light-shielding door;

loading means for executing a loading operation when the film cartridge is mounted in the camera;

battery checking means for measuring a battery voltage level; and control means for permitting operation of both the open/close driving means and the loading means when the measured battery voltage level is at a first decision level or above, and for permitting only the operation of the open/close driving means when the measured battery voltage level is at or above a second decision level lower than the first decision level.

17. A camera adapted to use a film cartridge having a film accommodated therein, an opening for feeding out the film, and a light-shielding door for shielding and releasing the opening, the camera comprising:

open/close driving means for electrically driving the light-shielding door;

loading means for executing a loading operation when the film cartridge is mounted in the camera;

battery checking means for comparing a voltage level of a power source battery with a predetermined level; and control means for controlling operation of only the open/close driving means to be executed when a decision has been made that the voltage level of the power source battery measured by the battery checking means is less than the predetermined level, and for prohibiting operation of the loading means, at a time of mounting the film cartridge.

18. A camera adapted to use a film cartridge having a film accommodated therein, an opening for feeding out the film, and a light-shielding door for shielding and releasing the opening, the camera comprising:

open/close driving means for electrically driving the light-shielding door;

loading means for executing a loading operation when the film cartridge has been mounted in the camera;

battery checking means for measuring a battery voltage level; and means for making the battery checking means operate after the open/close driving means has executed an open operation of the light-shielding door, at a time of mounting the film cartridge, and for determining whether or not to execute the loading operation according to the battery voltage level measured by the battery checking means.

19. A camera adapted to use a film cartridge having a film drawing opening and a light-shielding door disposed at the film drawing opening and biased in a closed state by an elastically deformable locking member, the camera comprising:

a cartridge accommodation chamber for accommodating the film cartridge;

a lid member provided on the cartridge accommodation chamber;

mounting memory means for storing data indicating whether or not the film cartridge has been mounted in the cartridge accommodation chamber;

open/close driving means for locking/unlocking the lid member of the cartridge accommodation chamber in accordance with the data stored in the mounting memory means, and for open/close driving the light-shielding door of the film cartridge accommodated in the cartridge accommodation chamber;

film loading means for executing a film loading operation when the film cartridge has been mounted in the cartridge accommodation chamber;

battery checking means for measuring a remaining capacity of a power source battery; and control means for controlling the open/close driving means and the film loading means according to the remaining capacity of the power source battery measured by the battery checking means.

20. A camera according to claim 19, wherein the control means prohibits canceling of a locking operation of the lid member of the cartridge accommodation chamber when the film cartridge has not yet been mounted and also when the measured remaining capacity of the power source battery is less than a predetermined value.

21. A camera according to claim 19, wherein the control means prohibits a close driving operation of the light-shielding door by the open/close driving means when the film cartridge has been mounted and also when the measured remaining capacity of the power source battery is less than a predetermined value.

* * * * *